(12) United States Patent
Campbell et al.

(10) Patent No.: US 11,598,659 B2
(45) Date of Patent: *Mar. 7, 2023

(54) SONIC ANEMOMETER

(71) Applicant: METER GROUP, INC. USA, Pullman, WA (US)

(72) Inventors: Gaylon S. Campbell, Pullman, WA (US); Nathan Taysom, Colton, WA (US); Colin S. Campbell, Pullman, WA (US); Douglas R. Cobos, Pullman, WA (US)

(73) Assignee: METER GROUP, INC., Logan, UT (US)

( * ) Notice: Subject to any disclaimer, the term of this patent is extended or adjusted under 35 U.S.C. 154(b) by 463 days.

This patent is subject to a terminal disclaimer.

(21) Appl. No.: 16/702,397

(22) Filed: Dec. 3, 2019

(65) Prior Publication Data

US 2020/0109978 A1 Apr. 9, 2020

Related U.S. Application Data

(63) Continuation of application No. 15/796,657, filed on Oct. 27, 2017, now Pat. No. 10,495,499.

(51) Int. Cl.
*G01F 1/66* (2022.01)
*G01P 5/24* (2006.01)
(Continued)

(52) U.S. Cl.
CPC .............. *G01F 1/662* (2013.01); *G01P 5/242* (2013.01); *G01S 7/521* (2013.01); *G01S 7/539* (2013.01);
(Continued)

(58) Field of Classification Search
CPC .......... G01F 1/662; G01P 5/242; G01S 7/521; G01S 7/539; G01S 15/003; G01S 15/58; G01W 1/00
See application file for complete search history.

(56) References Cited

U.S. PATENT DOCUMENTS 7,194,919 B2   3/2007  Shkarlet et al.
7,240,566 B2   7/2007  Froehlich et al.
(Continued)

FOREIGN PATENT DOCUMENTS

| CN | 110824192 A | * | 2/2020 | .............. G01P 13/02 |
| CN | 210803513 U | * | 6/2020 | .............. G01P 13/02 |
| WO | WO-2021062949 A1 | * | 4/2021 | .............. G01P 13/02 |

OTHER PUBLICATIONS

Osborn, Anemoment™—Compact Ultrasonic Anemometers,TriSonica™ Mini, web.archive.org/web/20170427113843/http://anemoment.com/ (Webpage archived on Apr. 27, 2017). (Year: 2017).*

(Continued)

*Primary Examiner* — Daniel Pihulic
(74) *Attorney, Agent, or Firm* — Dorsey & Whitney LLP

(57) ABSTRACT

Techniques are described herein for displacing liquid away from a signal path of sonic signals in a signal anemometer. A sonic anemometer may include a membrane positioned between a sonic transducer and the open environment. The membrane may be formed of a hydrophobic material that repels the liquid. The membrane may also include a plurality of pores that impede the flow of liquid through the membrane but enables sonic signals to pass through the membrane. The sonic anemometer may also include a reflector that displaces liquid away from the signal path of the sonic anemometer. The reflector may include one or more pores that wick liquid away from the signal path.

20 Claims, 8 Drawing Sheets

(51) Int. Cl.
- *G01S 7/539* (2006.01)
- *G01W 1/00* (2006.01)
- *G01S 15/00* (2020.01)
- *G01S 7/521* (2006.01)
- *G01S 15/58* (2006.01)

(52) U.S. Cl.
CPC ............ *G01S 15/003* (2013.01); *G01S 15/58* (2013.01); *G01W 1/00* (2013.01)

(56) References Cited

U.S. PATENT DOCUMENTS

| | | | |
|---|---|---|---|
| 7,296,482 | B2 | 11/2007 | Schaffer et al. |
| 7,426,443 | B2 | 9/2008 | Simon |
| 7,469,599 | B2 | 12/2008 | Froehlich et al. |
| 7,987,732 | B2 | 8/2011 | Konzelmann et al. |
| 8,347,734 | B2 | 1/2013 | Berger et al. |
| 8,671,774 | B2 | 3/2014 | Murakami et al. |
| 9,027,414 | B2 | 5/2015 | Satou et al. |
| 9,541,431 | B2 | 1/2017 | Nakano et al. |
| 9,551,603 | B2 | 1/2017 | Satou et al. |
| 9,778,084 | B2 | 10/2017 | Satou et al. |
| 9,874,466 | B2 | 1/2018 | Leaders et al. |
| 10,495,499 | B2 * | 12/2019 | Campbell ............... G01P 5/242 |
| 2007/0220995 | A1 | 9/2007 | Kishiro et al. |
| 2007/0261487 | A1 | 11/2007 | Sintes et al. |
| 2012/0055263 | A1 | 3/2012 | Konzelmann |
| 2013/0061686 | A1 | 3/2013 | Fujii et al. |
| 2016/0265954 | A1 | 9/2016 | Bachmann et al. |
| 2018/0149511 | A1 | 5/2018 | Ploss et al. |
| 2019/0128713 | A1 * | 5/2019 | Campbell ............... G01W 1/00 |
| 2020/0109978 | A1 * | 4/2020 | Campbell ............... G01F 1/662 |

OTHER PUBLICATIONS

Operator's Manual for DS-2 Sonic Anemometer. Decagon Devices, Inc. (Jul. 7, 2017), Available online at: https://www.google.com/url?sa=t&rct=j&q=&esrc=s&source=web&cd=3&ved=2ahUKEwipurK2kKvjAhXCK80KHe6JDXQQFjACegQIBhAC&url=http%3A%2F%2Fmanuals.decagon.com%2FManuals%2F14586_DS2_Web.pdf&usg=AOvVaw3cApuNqTB2kSya4a-lyruY.

* cited by examiner

SONIC ANEMOMETER

RELATED APPLICATION

This is a continuation of U.S. patent application Ser. No. 15/796,657 filed on 27 Oct. 2017, now U.S. Pat. No. 10,495,499, issued on 3 Dec. 2019, the disclosure of which is incorporated, in its entirety, by this reference.

BACKGROUND

The following relates generally to sonic anemometers and techniques for using sonic anemometers.

Sonic anemometers may use sonic signals or ultrasonic signals to measure a velocity of air movement (e.g., wind velocity). Unlike other types of anemometers, sonic anemometers do not include moving mechanical parts, making them a suitable choice for long-term use in exposed environments. For example, the performance of a cup-and-vane anemometer may be adversely affected by being exposed to salt or dust in the air over a long period of time, while a sonic anemometer may not be affected by such conditions.

SUMMARY

In one embodiment, a sonic anemometer may include a sonic transducer, a reflector positioned in a signal path of a sonic signal emitted by the sonic transducer, and at least one member positioned in the signal path, the at least one member including a plurality of pores formed therein, where at least one of the reflector and the at least one member are configured to displace liquid from the signal path of the sonic signal.

In some examples of the sonic anemometer described above, at least a portion of the reflector includes a plurality of pores extending from a first surface of the reflector and a second surface of the reflector.

In some examples of the sonic anemometer described above, the plurality of pores of the reflector are configured to wick water away from the first surface of the reflector.

In some examples of the sonic anemometer described above, the plurality of pores of the at least one member extend between a first surface of the at least one member and a second surface of the at least one member, each pore of the plurality of pores being sized to impede liquid from passing through the at least one member while permitting the sonic signal to travel through the at least one member.

In some examples of the sonic anemometer described above, the at least one member is formed from a first material that is hydrophobic and is configured to repel the liquid away from the signal path associated with the sonic transducer.

In one embodiment, a sonic anemometer may include a base having a top surface, a lid positioned above the base, the lid having a bottom surface spaced apart from the top surface of the base, a first sonic transducer positioned in the lid, a membrane coupled with the lid and configured to displace liquid from a sonic signal path associated with the first sonic transducer and enable a sonic signal associated with the first sonic transducer to travel through the membrane, and a reflective disk coupled with the base and positioned in the sonic signal path associated with the first sonic transducer, the reflective disk configured to reflect sonic signals traveling between the first sonic transducer and a second sonic transducer, the reflective disk configured to displace liquid from a first surface of the reflective disk.

In some examples of the sonic anemometer described above, the membrane is positioned in the sonic signal path associated with the first sonic transducer.

In some examples of the sonic anemometer described above, the membrane includes a plurality of pores extending between a first surface of the membrane and a second surface of the membrane, each pore of the plurality of pores being sized to impede the liquid from passing through the membrane while permitting the sonic signals to travel through the membrane. In some examples of the sonic anemometer described above, each pore of the plurality of pores exhibits a diameter that is between approximately 90 microns and approximately 160 microns.

In some examples of the sonic anemometer described above, the membrane is formed from a polyethylene material that is hydrophobic and is configured to repel the liquid away from the sonic signal path associated with the first sonic transducer.

In some examples of the sonic anemometer described above, the membrane includes a surface that is configured to be orthogonal to the sonic signal path associated with the first sonic transducer when the membrane is coupled with the lid.

In some examples of the sonic anemometer described above, at least a portion of the reflective disk includes a plurality of pores extending from the first surface of the reflective disk and a second surface of the reflective disk, the plurality of pores of the reflective disk being configured to wick water away from the first surface of the reflective disk. In some examples of the sonic anemometer described above, each pore of the plurality of pores exhibits a diameter that is between approximately 40 micrometers and approximately 100 micrometers.

In some examples of the sonic anemometer described above, the reflective disk is further configured to reflect additional sonic signals communicated between a third sonic transducer and a fourth sonic transducer. In some examples of the sonic anemometer described above, the reflective disk comprises sintered glass.

In some examples of the sonic anemometer described above, the base includes a first opening having a first diameter and sized to receive the reflective disk, and a second opening having a second diameter positioned below the reflective disk, the second diameter being less than the first diameter, the second opening being configured to drain water away from the reflective disk.

In some examples of the sonic anemometer described above, a third sonic transducer and a fourth sonic transducer positioned in the lid and configured to communicate sonic signals to determine a wind velocity, the reflective disk being configured to reflect the sonic signals traveling between the third sonic transducer and the fourth sonic transducer.

In some examples of the sonic anemometer described above, the first sonic transducer is a piezoelectric sonic transducer configured to both transmit sonic signals and receive sonic signals.

Some examples of the sonic anemometer described above may also include a processor positioned in the lid to determine a wind velocity based at least in part on at least one difference between a measured characteristic of the sonic signal reflected off of the reflective disk and an expected characteristic of the sonic signal when no wind is present.

In one embodiment, a sonic anemometer may include a base, a lid positioned above the base, a sonic transducer positioned in the lid, and a reflector coupled with the base and positioned in a signal path associated with the sonic transducer, the reflector configured to reflect a sonic signal emitted by the sonic transducer, the reflector configured to displace liquid from a first surface of the reflector.

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
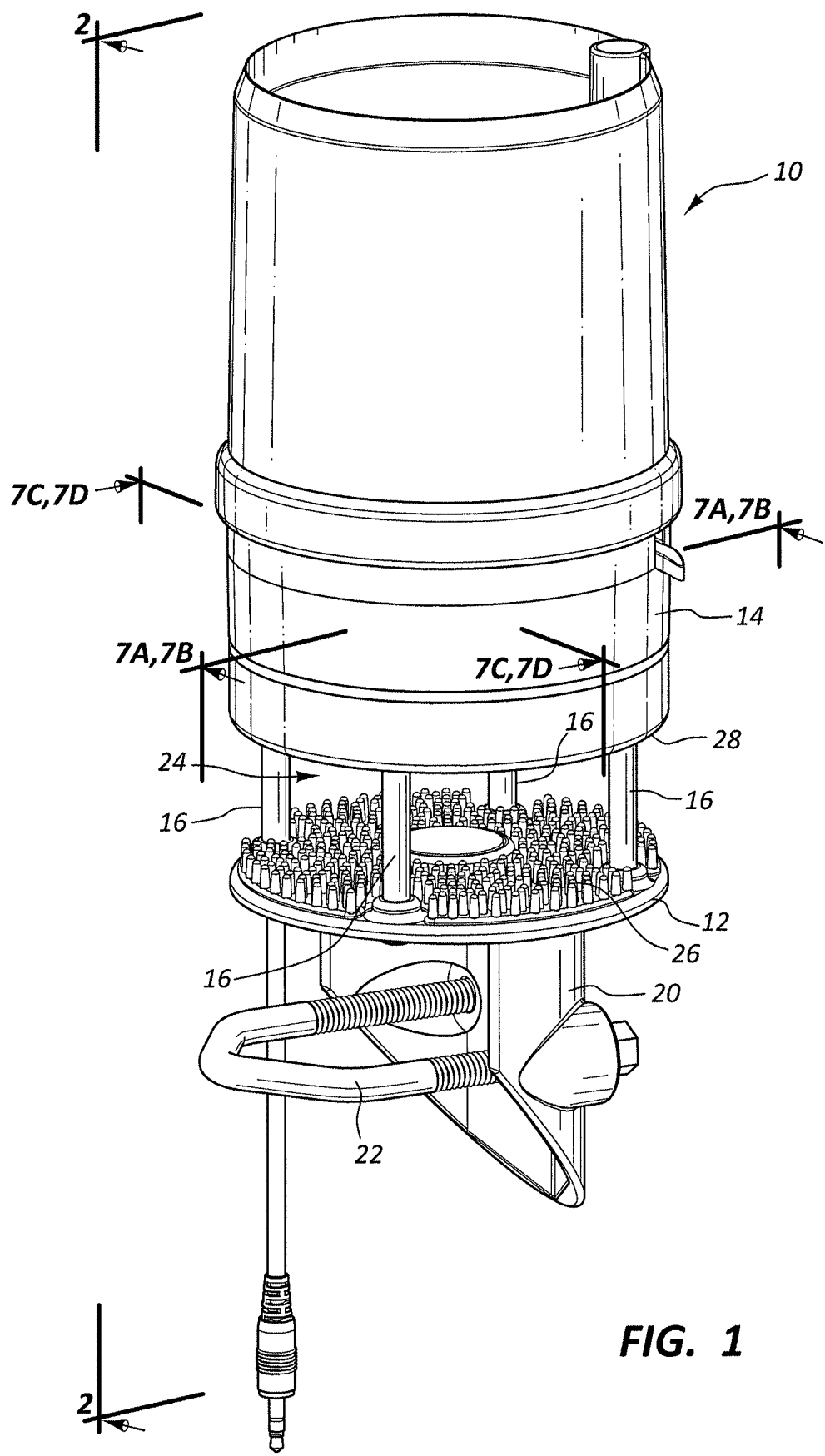
FIG. 1 illustrates a perspective view of a sonic anemometer according to an embodiment of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

Sonic anemometers may be positioned in an open-environment in the field to measure air movement (e.g., wind velocity). In some circumstances, users may prefer sonic anemometers for long-term field deployments because they lack moving parts, which increases how long the sonic anemometers may provide accurate readings. One potential disadvantage to sonic anemometers is that liquid (e.g., precipitation) in the signal path may reduce the accuracy of the air movement measurements. Some sonic anemometers have covers or lids that protect the signal paths from precipitation. While those types of sonic anemometers may be protected from precipitation falling straight down, wind may still carry precipitation into the sonic anemometer and splashing may allow liquid to get into other portions of the sonic anemometer. If liquid collects in the signal path, the sonic anemometer's measurements may be distorted and less accurate.

Techniques are described herein for displacing liquid away from a signal path of sonic signals in a signal anemometer. The sonic anemometer may include a membrane positioned between a sonic transducer and the open environment. The membrane may be formed of a hydrophobic material that repels the liquid. The membrane may also include a plurality of pores that impedes the flow of liquid through the membrane but allows sonic signals to pass through the membrane. The sonic anemometer may also include a reflector that displaces liquid away from the signal path of the sonic anemometer. The reflector may include one or more pores or passages that wick liquid away from the signal path.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 illustrates a sonic anemometer 10 configured to determine one or more parameters associated with air movement of an environment surrounding the sonic anemometer 10. For example, the sonic anemometer 10 may be configured to determine a velocity (including both magnitude and direction) of wind. The sonic anemometer 10 may include a base 12, a lid 14, a plurality of pillars 16 extending between the base 12 and the lid 14, and at least one transmitter/receiver pair (shown in FIG. 2) to communicate sonic signals.

A sonic anemometer 10 may determine the velocity of moving air (e.g., wind) by measuring one or more parameters of a transmitted sonic signal and comparing those measured parameters to one or more expected parameters of the sonic signal. As the sonic signal travels along its signal path between the transmitter and the receiver, the moving air may affect the sonic signal. The magnitude and/or direction of travel of the moving air may be determined based on one or more differences between the received sonic signal and the transmitted sonic signal. In some examples, the sonic anemometer 10 may use a plurality of sonic signals traveling in a plurality of directions to accurately determine a velocity (e.g., magnitude and direction) of moving air. In some examples, the sonic anemometer 10 may include a plurality of transceivers that are each capable of both transmitting and receiving sonic signals, rather than having dedicated transmitters and dedicated receivers.

The base 12 of the sonic anemometer 10 may be configured to secure the sonic anemometer in a fixed position relative to another structure. For example, the base 12 may be configured to secure the sonic anemometer to a pole. Wind velocity and wind velocity measurements may depend on obstructions surrounding an anemometer. As air flows around, over, or under obstructions, the speed of moving air may be effected (e.g., the moving air may slow down). Even in an open area, the speed of moving air may be slower near the ground. Obstructions that effect wind velocity may include buildings, the ground (e.g., hills and valleys), plants (e.g., trees, bushes, etc.), animals, human beings, etc. To ensure that measurements of a velocity of moving air are accurate, the sonic anemometer 10 may be mounted to another structure and strategically positioned relative to other structures.

The base 12 may include a fixed member 20 and movable member 22 that cooperate to secure the sonic anemometer 10 to another structure. The movable member 22 may be coupled with the fixed member 20 using a fastener such as a screw, bolt, nail, latch, a u-bolt, other type of fastener, or a combination thereof. The base 12 may cooperate with the other structure to adjust a position and/or orientation of the sonic anemometer 10 in free space. For example, the base 12 may be configured to adjust the height of the sonic anemometer 10 off of the ground or adjust the directional orientation of sonic anemometer 10 (e.g., orient a particular side of the sonic anemometer 10 to be facing north).

The lid 14 may be configured to mitigate interference of sonic signals of the sonic anemometer 10 caused by objects falling into a signal path. For example, the lid 14 may be configured to mitigate rain collecting in a signal path of a sonic signal or other objects (e.g., plant matter such as limbs or twigs or animals). When objects such as rain, twigs, branches and other material are in a signal path of the sonic signal they may interfere with sonic signals. As such, some changes in the sonic signal may be introduced by the interfering object rather than by moving air. In such situations, the sonic anemometer 10 may provide inaccurate determinations of the velocity of the moving air.

The pillars 16 may be sized to create a gap 24 a top surface 26 of the base 12 from a bottom surface 28 of the lid 14. The gap 24 may be sized to enable air in the environment surrounding the sonic anemometer 10 to move freely between the base 12 and the lid 14 (e.g., minimize disturbances to the moving air caused by the base 12 and the lid 14). The gap 24 may also be sized based on a desired signal path length of a sonic signal communicated using the sonic anemometer 10. If a signal path of sonic signals is too long or too short, it may introduce errors into the determination of air velocity. Accordingly, the gap 24 may be sized based on a desired signal path length as well as minimizing perturbations to air moving through sonic anemometer 10.

The lid 14 may also be configured to house the transmitter/receiver pairs associated with sonic signals and other electronic components (e.g., processor, memory, etc.). In some examples, base 12 may be configured to house the transmitter/receiver pairs associated with sonic signals and other electronic components. In other examples, the transmitter/receiver pairs and/or the other electronic components may be housed in both the base 12 and the lid 14.

Figure 2:
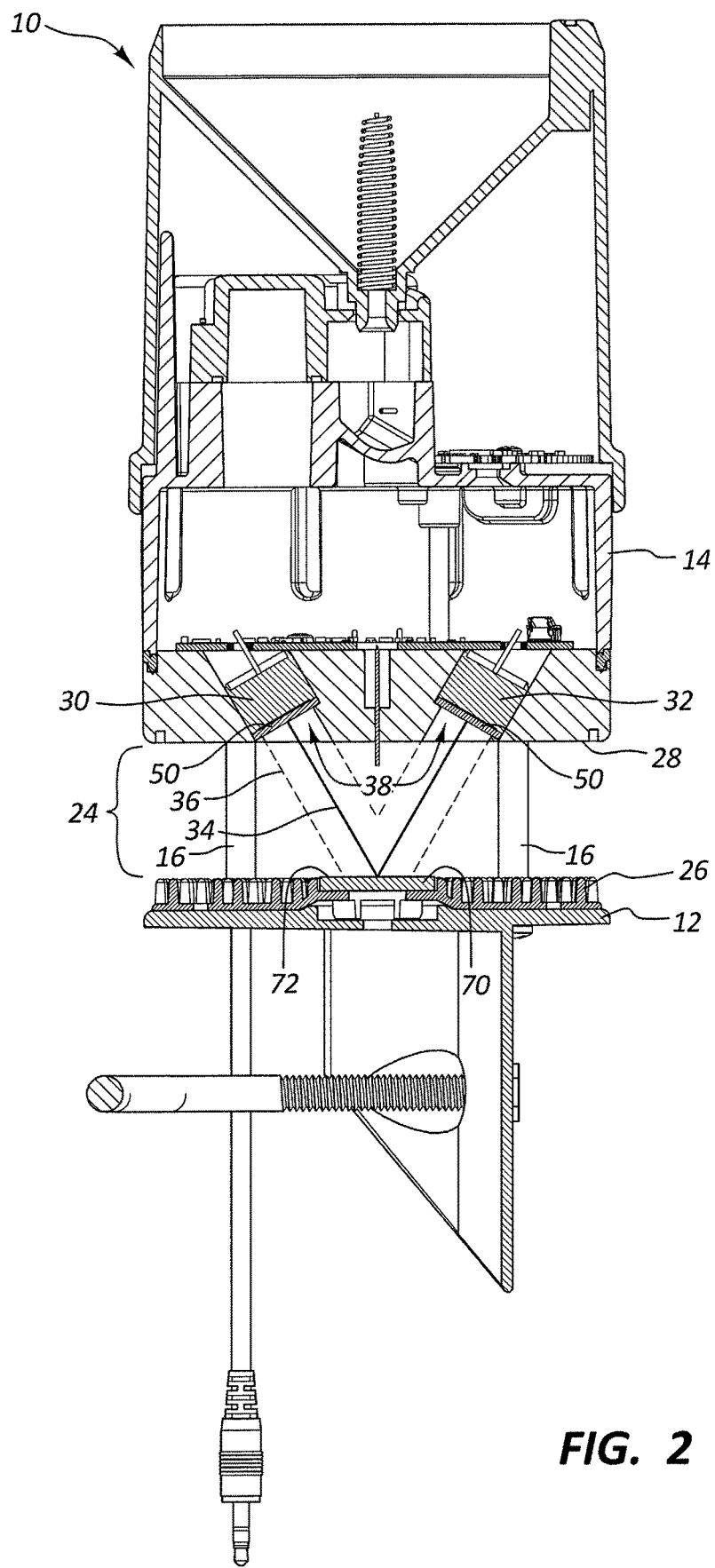
FIG. 2 illustrates a cross-sectional side elevation view taken along the lines 2-2 of an embodiment of the sonic anemometer of FIG. 1.

FIG. 2 illustrates a cross-sectional side elevation view of the sonic anemometer 10. The sonic anemometer 10 may also include a first sonic transducer 30, a second sonic transducer 32, and a reflector 70. The first sonic transducer 30 and the second sonic transducer 32 may be an example of a transmitter/receiver pair as described with reference to FIG. 1.

The first sonic transducer 30 may be configured as a transmitter and may transmit a sonic signal 34 to the second sonic transducer 32, which may be configured as a receiver, along a signal path 36. The reflector 70 may be positioned in the signal path 36 and may be configured to alter a direction of travel of the sonic signal 34. For example, the reflector 70 may reflect the sonic signal 34 transmitted by first sonic transducer 30 toward the second sonic transducer 32.

The first sonic transducer 30 and the second sonic transducer 32 may be positioned in the lid 14. In some cases, the first sonic transducer 30 and/or the second sonic transducer 32 may be set back from a bottom surface 28 of the lid 14. The lid 14 may include apertures 38 extending from the bottom surface 28 of the lid 14 to the respective transducer (e.g., the first sonic transducer 30 or the second sonic transducer 32) to enable the sonic signal to reach the gap 24 defined in the sonic anemometer 10. In some cases, the sonic transducers 30, 32 may be positioned at an angle α relative to the bottom surface 28 of the lid 14 and/or the top surface 26 of the base 12. The angle α may be configured such that the sonic signal 34 travels at a non-orthogonal angle relative to the likely direction of air movement in the gap 24. The angle α also may be configured based on a position of the transmitting sonic transducer, a position of the receiving sonic transducer, whether the sonic signal 34 is intended to be reflected by an area of the sonic anemometer (e.g., reflector 70), a desired signal path length, a size of the gap 24, or a combination thereof.

In some cases, the sonic transducers 30, 32 may be examples of piezoelectric transducers or capacitive transducers. In some cases, the sonic transducers 30, 32 may be configured to communicate ultrasonic signals with frequencies that are higher than the upper audible limit of human hearing. In such cases, the sonic signal 34 may be an example of an ultrasonic signal.

The sonic anemometer 10 may include any number of sonic transducers 30, 32 or sonic transducer pairs that act as transmitters and receivers (e.g., the sonic anemometer 10 may include two, three, four, five, six, seven, eight, nine, ten, or more sonic transducers 30, 32). In the illustrative example, the sonic anemometer 10 may include four sonic transducers divided into two pairs of sonic transducer transceivers. Each pair of transducers 30, 32 may be configured to exchange sonic signals 34 between them. In some cases, a single sonic signal receiver may be configured to receive sonic signals from multiple sonic signal transmitters.

In some cases, each sonic transducer 30, 32 is a transceiver configured to transmit and receive various sonic signals 34. In some cases, a sonic transducer is configured to be a dedicated transmitter of the sonic signal 34 or a dedicated receiver of the sonic signal 34. In such cases, the sonic anemometer 10 may include a transmitter/receiver pair configured to communicate the sonic signal 34 from the transmitter to the receiver.

The reflector 70 may be positioned in the base 12. The reflector 70 may be an example of any component configured to reflect the sonic signal 34 along its signal path 36 between the first sonic transducer 30 and the second sonic transducer 32. The reflector 70 may include a first surface 72 shaped to reflect the sonic signal 34 in a desired direction and angle. In some cases, the first surface 72 may be a planar surface. In some cases, the reflector 70 may be a separate component from the base 12 that is coupled with the base 12. For example, the reflector 70 may be a reflective disk and the base 12 may be sized and/or configured to receive the reflective disk. In some cases, the reflector 70 may be portion of the base 12 dedicated to reflecting the sonic signals 34 without being a separate component.

In the illustrative example of FIG. 2, the first sonic transducer 30 and the second sonic transducer 32 may be positioned in the lid 14 and the reflector 70 may be positioned in the base 12. In some examples, the first sonic transducer 30 and the second sonic transducer 32 may be positioned in the base 12 and the reflector 70 may be positioned in the lid 14. In some examples, the sonic anemometer 10 does not include a reflector 70 and the first sonic transducer 30 is positioned in the lid 14 and the second sonic transducer 32 is positioned in the base 12. In such examples, the signal path of the sonic signal 34 may be a straight line between the two sonic transducers 30, 32. In some examples, the sonic anemometer 10 may include two reflectors 70, one positioned in the base 12 and one positioned in the lid 14, and two sets of sonic transducers, one set positioned in the lid 14 and one set positioned in the base 12. In such configurations one reflector may be associated with one set of transducers and the other reflector may be associated with the other set of transducers.

The sonic anemometer 10 may be configured to determine characteristics about air moving in the signal path 36 based on differences between the sonic signal transmitted by the first sonic transducer 30 and the sonic signal received by the second sonic transducer 32. The first sonic transducer 30 and the second sonic transducer 32 may be coupled with electronic components that may define parameters of the transmitted sonic signal and may measure parameters of the received sonic signal. The sonic anemometer 10 may determine one or more expected parameters of a received sonic signal based on the parameters of the transmitted sonic signal. The expected parameters may be determined based on having no air movement during the sonic signal's transmission through the signal path 36. The sonic anemometer 10 may measure one or more parameters of the received sonic signal and compare those received parameters to the expected parameters. The sonic anemometer 10 may determine one or more characteristics of the air moving in the signal path 36 based on differences between the expected and measured parameters of the sonic signal 34. For example, if there is little air movement, the difference between the expected and measured values may be small.

In some cases, interference sources, other than moving air, may affect the sonic signal 34 as it travels between the first sonic transducer 30 and the second sonic transducer 32. One example of an interference source is liquid collecting in the signal path 36. Sonic anemometers are frequently positioned in outdoor environments to measure the velocity of the wind. When precipitation occurs, liquid may land on the base 12 and collect on the base 12. In some cases, the moisture that lands on the base 12 may splash or ricochet and may collect on other surfaces of the sonic anemometer 10 as well. Liquid may refer to precipitation or moisture in any physical state that may collect on the sonic anemometer 10. For example, precipitation may take the form of liquid water, snow, ice, sleet, hail, condensation, or a combination thereof.

Liquid that collects on surfaces of the sonic anemometer 10 may affect the sonic signal 34 traveling between the first sonic transducer 30 and the second sonic transducer 32, thereby causing the sonic anemometer 10 to provide an incorrect velocity measurement of the moving air. Two specific areas of the sonic anemometer 10 where collected liquid may interfere with the sonic signal 34 are the area of the base 12 that acts as a reflector of the sonic signal 34 and the apertures 38 of the lid 14 that extend between an opening in the bottom surface 28 of the lid 14 sonic transducers 30, 32, or, more specifically, on the surfaces of the sonic transducers 30, 32.

Various techniques may be used to displace liquid from a sonic signal path 36. In some cases, a member 50 (sometimes referred to as a membrane) may be positioned in the aperture 38 between the sonic transducer and the bottom surface 28 of the lid 14 away from the sonic transducer 30, 32 and out of the opening in the bottom surface 28 of the lid 14. The member 50 may be placed in the signal path 36. The member 50 may be formed from a hydrophobic material that repels the liquid. The member 50 may include a plurality of pores or channels that are sized to enable the sonic signal 34 to travel through the member 50 and to restrict the liquid's movement through the member 50.

In some cases, the reflector 70 may be configured to displace the liquid from a first surface 72 of the reflector 70. The reflector 70 may be formed of sintered glass that includes a plurality of pores or channels that wick liquid away from the first surface 72 of the reflector 70 using capillary action. In some cases, the sonic anemometer 10 may include one or more members 50 and a reflector 70 to displace water from the signal path 36.

Figure 3:
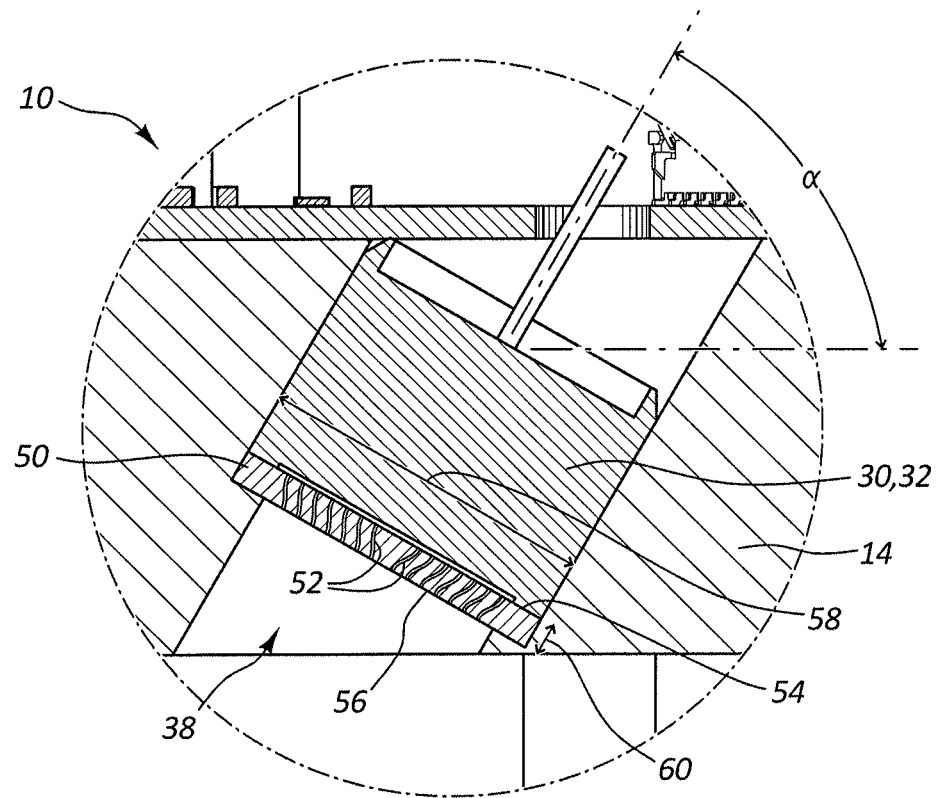
FIG. 3 illustrates a cross-sectional view of a membrane of the sonic anemometer of FIG. 1.

FIG. 3 illustrates a cross-sectional side elevation view of a sonic transducer 30 and the member 50 positioned in the signal path 36 associated with the sonic transducer 30. The member 50 may be configured to displace liquid away from the signal path 36 and configured to enable the sonic signal 34 to pass through the member 50. The member 50 may be configured to prevent liquid from collecting in the signal path 36 and prevent liquid from interfering with the sonic signal 34 as it travels between sonic transducers 30, 32. To perform these functions, the member 50 may be formed of a hydrophobic material and may include a plurality of pores 52 or channels.

As discussed previously, liquid (e.g., from precipitation or condensation) may collect in the signal path 36 associated with the sonic transducers 30, 32. The collected liquid may interfere with a sonic signal 34 and cause the sonic anemometer 10 to provide incorrect readings about the velocity (e.g., magnitude and/or direction) of air moving in and around the sonic anemometer 10.

The member 50 may be formed of a hydrophobic material such that the member 50 may repel the liquid away from the member 50. Because the member 50 may be hydrophobic, there may be fewer surfaces for the water to cling to and collect against. By repelling the liquid away, the member 50 may cause the liquid to be displaced out of the signal path 36. Hydrophobic materials may include molecules that are non-polar. In some cases, the member 50 may be formed from a polyethylene material.

The member 50 may also include a plurality of pores 52, sometimes referred to as a plurality of channels. The pores 52 may extend between a first surface 54 of the member 50 facing the sonic transducer 30 and a second surface 56 of the member 50 opposite the first surface 54. The pores 52 may be sized to prevent (or mitigate the travel of) liquid passing through the member 50 and sized to allow sonic signals to pass through the member 50.

Just as liquid and other objects positioned in the signal path 36 may interfere with sonic signals 34, so too the member 50 may interfere with sonic signals 34. Consequently, designers have not typically used members or membranes to displace liquid that collects in the signal path 36 of the sonic anemometer 10. The pores 52 of the member 50 may be sized to minimize interference with the sonic signal 34 that passes through the member 50 and to impede the travel of liquid through the member 50. In addition, the frequency of pores 52 in the member 50 may define a porosity (or a ratio of open space to closed space in a body) that is configured to minimize interference with the sonic signal 34 that passes through the member 50 and to impede the travel of liquid through the member 50. In some cases, each pore 52 of the plurality of pores exhibits a diameter that is between approximately 90 microns and approximately 160 microns. In some cases, each pore 52 of the plurality of pores exhibits a cross-sectional area that is between 6,000 micrometers squared and 21,000 micrometers squared.

The member 50 may be positioned in the signal path 36 between the first sonic transducer 30 and second sonic transducer 32. In some cases, the member 50 may be positioned in the signal path 36 between the first sonic transducer 30 and the reflector 70. In some examples, the member 50 may be positioned in the signal path between the first sonic transducer 30 and the bottom surface 28 of the lid. In some cases, the member 50 may be positioned such that at least one surface (e.g., the first surface 54 or the second surface 56) is positioned orthogonal to the signal path 36 when the member 50 is coupled with the lid 14.

The member 50 may also define a diameter 58 (or other cross-sectional geometry) and a thickness 60. The diameter 58 may be sized such that the member 50 is secured in the aperture 38 of the lid 14 between the bottom surface 28 and the sonic transducer 30. In some cases, the diameter 58 may be about 0.641 inches. The thickness 60 may be sized so as to minimize interference with the sonic signal 34. In some cases, the thickness 60 may be about 0.062 inches.

Figure 4:
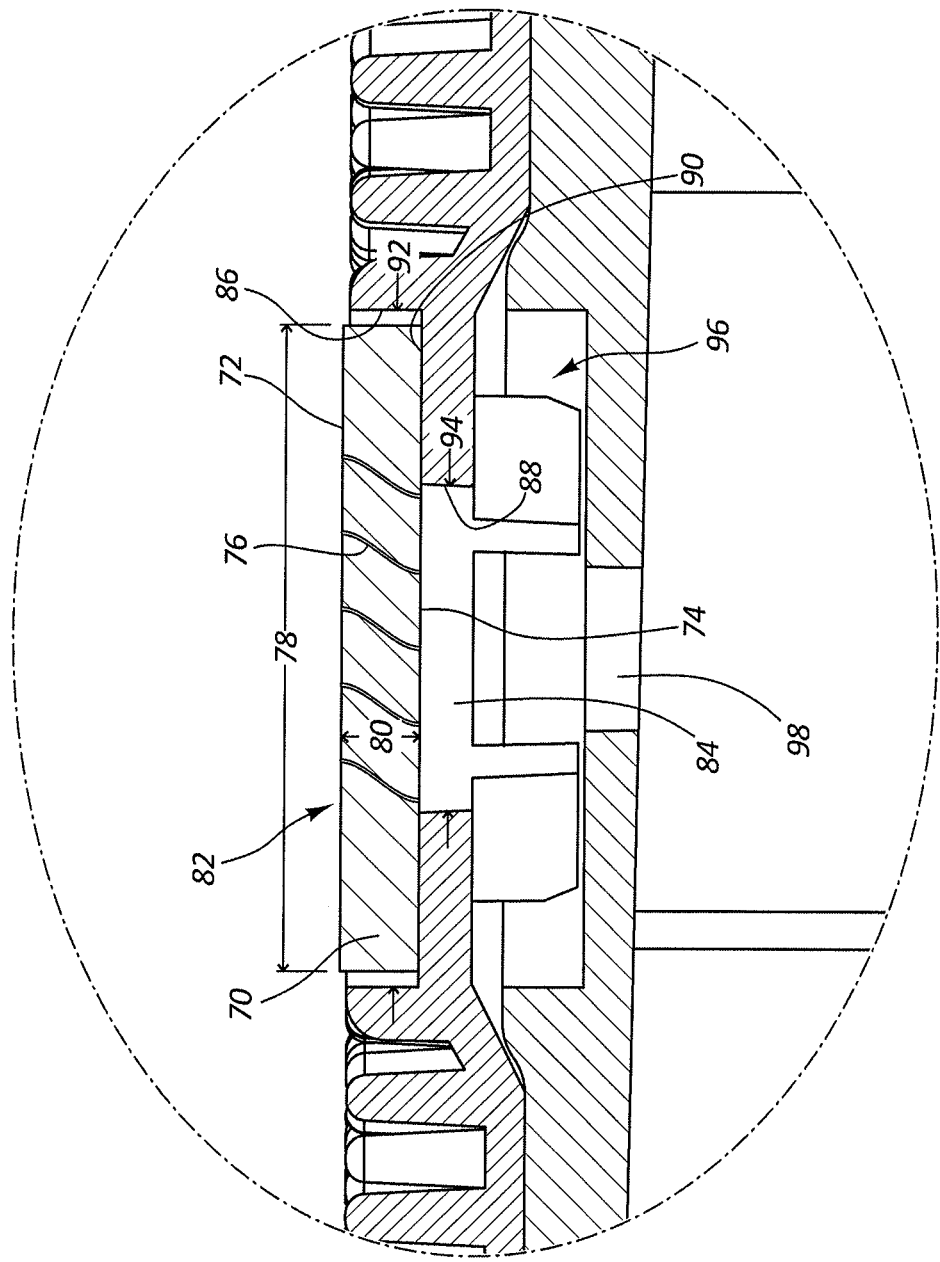
FIG. 4 illustrates a cross-sectional view of a reflector of the sonic anemometer of FIG. 1.

FIG. 4 illustrates a cross-sectional side elevation view of a reflector 70 positioned in the signal path 36 associated with a sonic transducer. The reflector 70 may be configured to reflect a sonic signal 34 as it travels along its signal path 36 between a transmitter and a receiver (e.g., a transducer pair). The reflector 70 may also be configured to displace liquid away from the signal path 36 and thereby reduce potential interferences with the sonic signal 34 traveling along the signal path 36.

As discussed previously, liquid (e.g., from precipitation or condensation) may collect in the signal path 36 associated with the sonic transducers 30, 32. The collected liquid may interfere with a sonic signal 34 and cause the sonic anemometer 10 to provide incorrect readings about the velocity (e.g., magnitude and direction) of air moving in and around the sonic anemometer 10.

In some cases, the reflector 70 may have hydrophilic properties based on the material that forms the reflector 70, the structural configuration of the reflector 70, or a combination thereof. For example, the reflector 70 may be formed of a hydrophilic material. In some examples, the reflector 70 may be formed of a hydrophilic glass.

The reflector 70 may also include a plurality of pores 76 (sometimes referred to as a plurality of channels) that extend between the first surface 72 and a second surface 74 of the reflector 70 opposite the first surface 72. Each pore 76 of the reflector 70 may be sized and/or configured to wick liquid away from the first surface 72 through capillary action. For example, the diameter/size of each pore 76 may be sized such that the surface tension of the liquid and the adhesive forces between the liquid and the walls of the pore 76 may exert a force on the liquid on the first surface 72 of the reflector 70.

In some cases, the hydrophilic nature of the glass that forms the reflector 70 and the plurality of pores 76 of the reflector 70 may cooperate to displace liquid from collecting in the signal path 36. For example, the hydrophilic nature of the reflector 70 and capillary action of the pores 76 of the reflector 70 may cooperate to wick water away from the first surface 72 of the reflector 70. Because the first surface 72 of the reflector 70 is positioned to face the sonic transducers 30, 32, removing liquid from the first surface 72 removes liquid from the sonic signal path 36.

The reflector 70 may be shaped like a disk that has a diameter 78 (or other cross-sectional geometry) and a thickness 80. The diameter 78 and the thickness 80 may be sized and/or configured to be received by the base 12 of the sonic anemometer 10. In some cases, the reflector 70 may be positioned in the lid 14 of the sonic anemometer 10 and the diameter 78 and the thickness 80 may be sized to be received in the lid 14. The reflector 70 may be any shape or size, in some examples.

The base 12 may be configured to receive the reflector 70. The base 12 may include a first aperture 82 that is sized to receive the reflector 70 and a second aperture 84 configured to enable liquid to drain away from the second surface 74 of the reflector 70. The first aperture 82 may be formed of one or more sidewalls 86 and the second aperture 84 may be formed of one or more sidewalls 88. The base 12 may include a support surface 90 for supporting the reflector 70. The support surface 90 may be configured to contact the second surface (e.g., the non-reflecting surface) of the reflector 70. The support surface 90 may extend between a sidewall 86 that defines the first aperture 82 and a sidewall 88 that defines the second aperture 84. The first aperture 82 may define a diameter 92 that is larger than a diameter 94 defined by the second aperture 84. In some cases, the reflector 70 and the associated structure in the base 12 may be other geometries. As such, the use of the terms diameter and/or thickness should not be considered limiting. Other geometries of the reflector 70 and the associated structure in the base 12 may highlight other types of dimensions (e.g., length, width, height).

The second aperture 84 may act as a drain through which liquid may escape from the base 12 and the reflector 70. In some cases, the second aperture 84 opens up to the environment surrounding the sonic anemometer 10. In some cases, second aperture 84 opens up to a cavity 96 in the base 12. A third aperture 98 may extend through the housing of the base 12 between the cavity 96 and the environment surrounding the sonic anemometer 10.

In some cases, the diameter 78 of the reflector 70 may be about 25 millimeters. In some cases, the thickness 80 of the reflector 70 may be about 3 millimeters. In some cases, each pore 76 of the plurality of pores exhibits a diameter that is between approximately 40 micrometers and approximately 100 micrometers. In some cases, each pore 76 of the plurality of pores exhibits a cross-sectional area that is between 1,200 micrometers squared and 8,000 micrometers squared.

Figure 5:
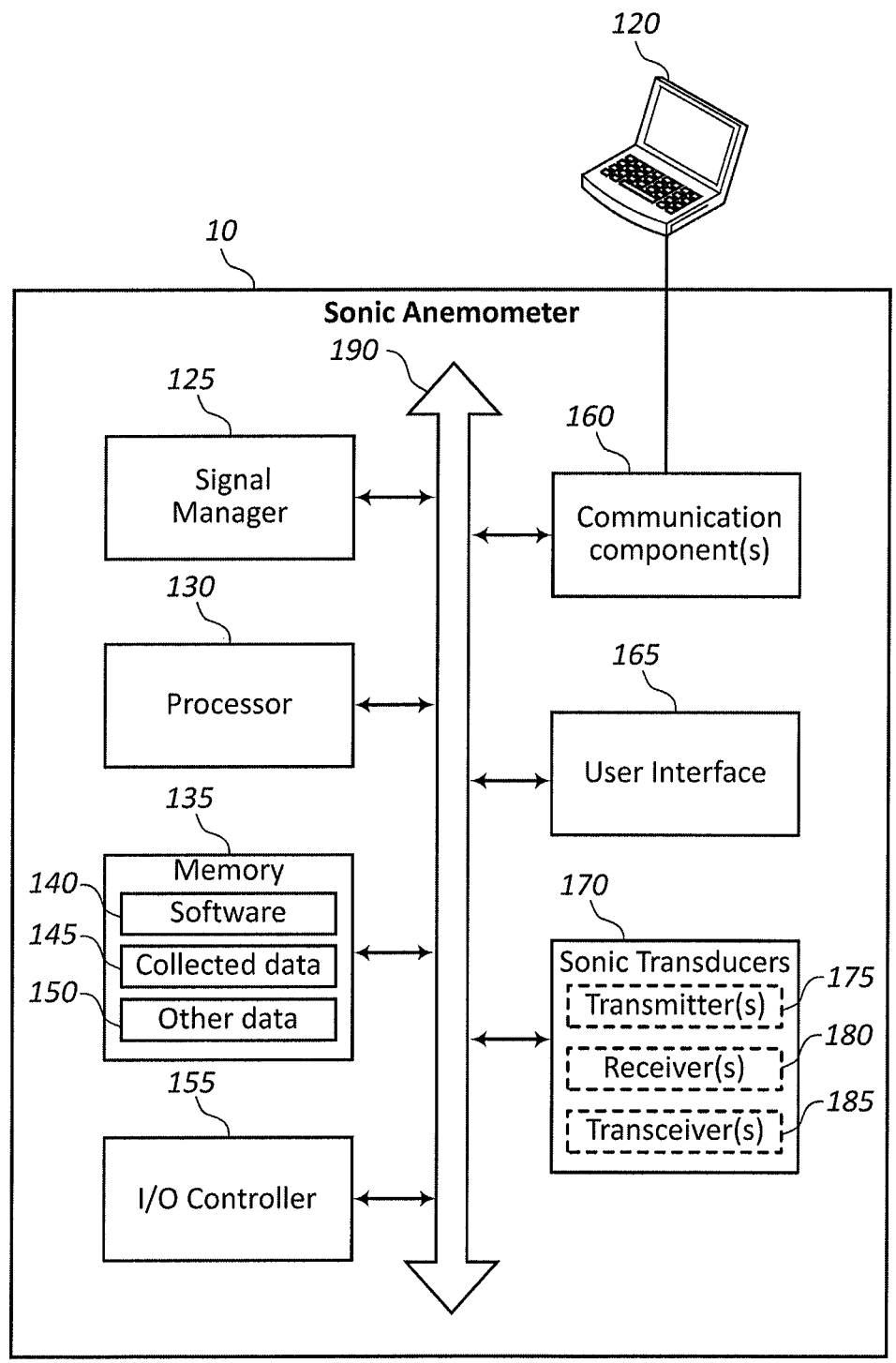
FIG. 5 illustrates a block diagram of the sonic anemometer of FIG. 1.

FIG. 5 shows a block diagram of some computing components of the sonic anemometer 10. The sonic anemometer 10 may include components for communicating sonic signals, determining one or more parameters of air movement in the environment surrounding the sonic anemometer, and data communications with a host device(s) 120 (e.g., a host computer, host server, or host network) including components for transmitting and receiving communications. The components of the sonic anemometer 10 may include a signal manager 125, processor 130, memory 135, software 140, I/O controller 155, communication component 160, user interface 165, and sonic transducers 170. These components may be in electronic communication via one or more busses (e.g., bus 190).

In some cases, the sonic anemometer 10 may communicate with a host device 120 (e.g., a local computing device, a remote computing device, a handheld computing device such as a smartphone, remote storage device, and/or a remote server, or a combination thereof). In some embodiments, one element of sonic anemometer 10 (e.g., one or more antennas, transceivers, etc.) may provide a data connection using wired or wireless techniques, including digital cellular connection, digital satellite data connection, and/or another connection.

The signal manager 125 may be configured to determine one or more parameters (e.g., magnitude and/or direction) about air movement in the environment surrounding the sonic anemometer 10. The signal manager 125 may determine one or more transmitted signal parameters and generate sonic signals or ultrasonic signals to be transmitted through the environment. The signal manager 125 may measure one or more received signal parameters of sonic signals or ultrasonic signals. The signal manager 125 may compare expected parameters (e.g., transmitted signal parameters) with measured parameters (e.g., received signal parameters) to determine one or more characteristics about air movement in the environment surrounding the sonic anemometer 10. Additional features of the signal manager are described herein, especially with reference to FIGS. 6-8.

Processor 130 may include an intelligent hardware device, (e.g., a general-purpose processor, a digital signal processor (DSP), a central processing unit (CPU), a microcontroller, an application-specific integrated circuit (ASIC), an field programmable gate array (FPGA), a programmable logic device, a discrete gate or transistor logic component, a discrete hardware component, or any combination thereof). In some cases, processor 130 may be configured to operate the memory 135 using a memory controller. In other cases, a memory controller may be integrated into processor 130. The processor 130 may be configured to execute computer-readable instructions stored in a memory to perform various functions.

Memory 135 may include random access memory (RAM) and/or read-only memory (ROM). The memory 135 may store computer-readable, computer-executable software 140 including instructions that, when executed, cause the processor to perform various functions described herein. In some cases, the memory 135 may store the signal data 145 associated with sonic signals communicated through the environment and other data 150. In some cases, the memory 135 may contain, among other things, a basic input/output system (BIOS) which may control basic hardware and/or software operation such as the interaction with peripheral components or devices.

Software 140 may include code to implement aspects of the present disclosure, including code to support the sonic anemometer 10. Software 140 may be stored in a non-transitory computer-readable medium such as system memory or other memory. In some cases, the software 140 may not be directly executable by the processor but may cause a computer (e.g., when compiled and executed) to perform functions described herein.

The signal data 145 may include data associated with transmitters of sonic signals and/or receivers of sonic signals. For example, the signal data 145 may include transmitted signal parameters and received signal parameters.

The other data 150 may include any other data associated with the signal data 145. For example, the other data 150 may include commands, routines, tasks, or processes used to analyze signal data 145 and/or determine characteristics about air velocity. For example, other data 150 may include processes to determine an air velocity based on changes in the phase of sonic signals. In other examples, other data 150 may include processes to apply phase shifts to distinguish between different velocities of air movement (e.g., as described in more detail with reference to FIG. 8).

I/O controller 155 may manage input and output signals for sonic anemometer 10. I/O controller 155 may also manage peripherals not integrated into sonic anemometer 10. In some cases, I/O controller 155 may represent a physical connection or port to an external peripheral. In some cases, I/O controller 155 may utilize an operating system such as iOS®, ANDROID®, MS-DOS®, MS-WINDOWS®, OS/2®, UNIX®, LINUX®, or another known operating system. In other cases, I/O controller 155 may represent or interact with a modem, a keyboard, a mouse, a touchscreen, or a similar device. In some cases, I/O controller 155 may be implemented as part of a processor. In some cases, a user may interact with the sonic anemometer 10 via I/O controller 155 or via hardware components controlled by I/O controller 155.

Communication component(s) 160 may communicate bi-directionally, via one or more antennas, wired, or wireless links as described above with a host device 120. For example, the communication component 160 may be an example of a wireless transceiver and may communicate bi-directionally with another wireless transceiver. The communication component 160 may also include a modem to modulate the packets and provide the modulated packets to the antennas for transmission, and to demodulate packets received from the antennas. In some examples, the communication component 160 may communicate bi-directionally using a wired connection and/or a wired modem.

The communication component 160 may be any other type of communication circuitry to establish communications (either wired or wireless) between the sonic anemometer 10 and the host device 120. The communication component 160 may include one or more universal serial bus (USB) ports, wireless networking circuitry, other network components or ports, or combinations thereof. The communication component 160 may be configured to establish a wireless communication link via a network. For example, the communication component 160 may establish wireless communication links using radio access technologies related to a wireless wide area network (WWAN) (GSM, CDMA, and WCDMA), a wireless local area network (WLAN) (including BLUETOOTH®, Wi-Fi, or other technologies that utilize IEEE 802.11 standards), WiMAX, a Wireless Personal Area Network (WPAN) (including radio frequency identification devices (RFID) and ultra-wideband (UWB)), a cellular network including 3G or Long Term Evolution (LTE), or a combination thereof.

The communication component 160 may be configured to establish a wired communication link via a network. For example, the other network components may include components related to video graphics array (VGA), data visual interface (DVI), high-definition multimedia interface (HDMI), serial advanced technology attachment (SATA), external SATA (eSATA), FireWire, Ethernet, PS/2, a serial connections, a RS-232 serial connection, a SDI12 serial connection, a DB-25 serial connection, a DE-9 serial connection, an S-Video connection, or a combination thereof.

User interface 165 may enable a user to interact with the sonic anemometer 10. The user interface 165 may include one or more input devices and/or one or more output devices. Input devices may include touchpads, touchscreens, microphones, motion sensors, light sensors, keypads, a mouse, or a combination thereof. Output devices may include screens, speakers, lights, indicators, or a combination thereof. In some cases, the same component may include both input device(s) and output device(s).

Sonic transducers 170 may include one or more transmitter(s) 175, one or more receiver(s) 180, or one or more transceiver(s) 185, or a combination thereof. The sonic transducers 170 may be an example of the sonic transducers 30, 32 described with reference to FIGS. 2-3. The sonic transducers 170 may be configured to transmit a sonic signal or an ultrasonic signal and/or receive a sonic signal or an ultrasonic signal.

Figure 6:
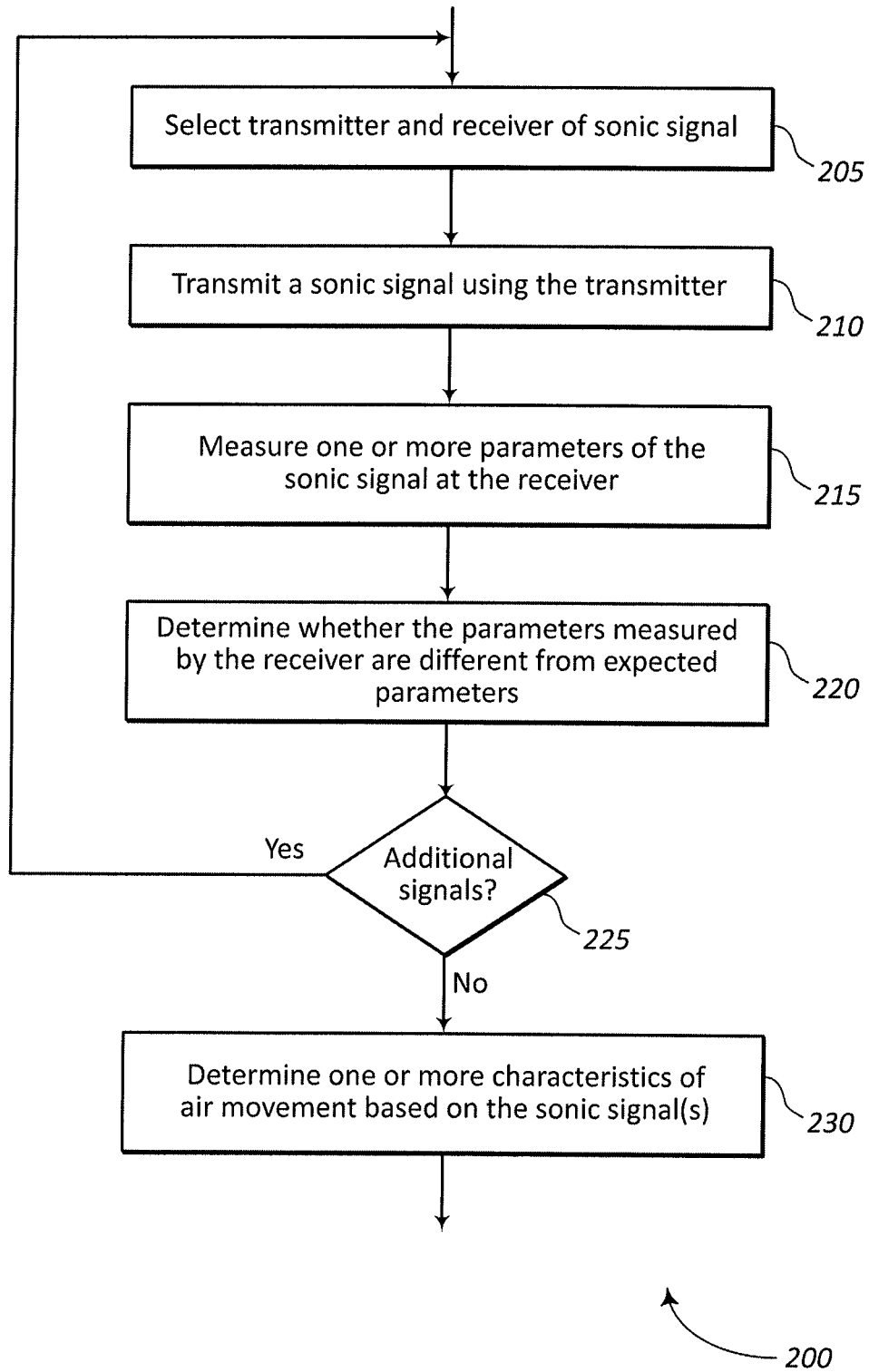
FIG. 6 illustrates a method of operation of the sonic anemometer of FIG. 1.
Figure 7A:
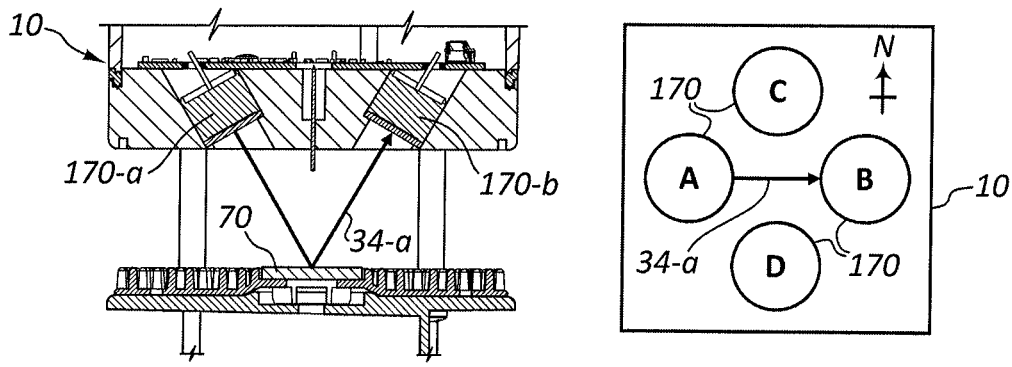
FIGS. 7A-7B illustrate block diagrams and cross-sectional side elevation views taken along the line 7-7 of the sonic anemometer of FIG. 1 as it communicates sonic signals.
Figure 7B:
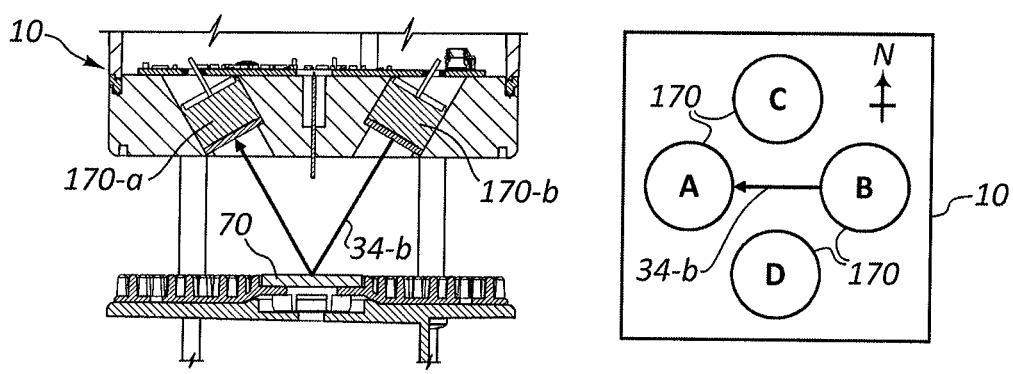
Figure 7C:
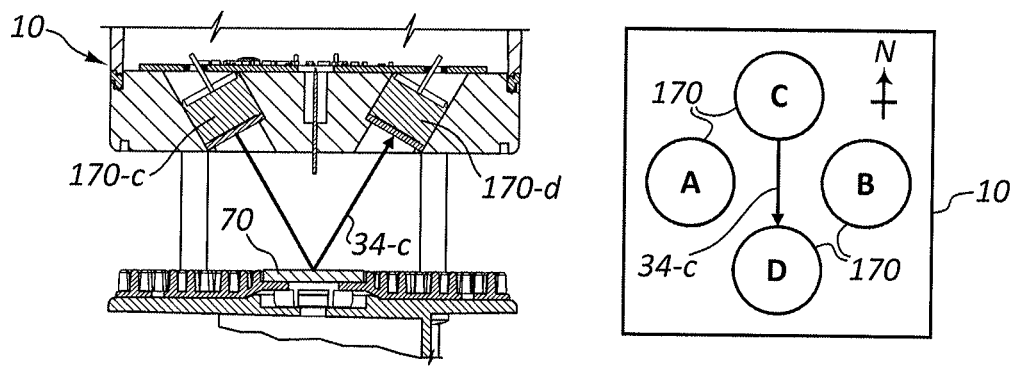
FIGS. 7C-7D illustrate block diagrams and cross-sectional side elevation views taken along the line 2-2 of the sonic anemometer of FIG. 1 as it communicates sonic signals.
Figure 7D:
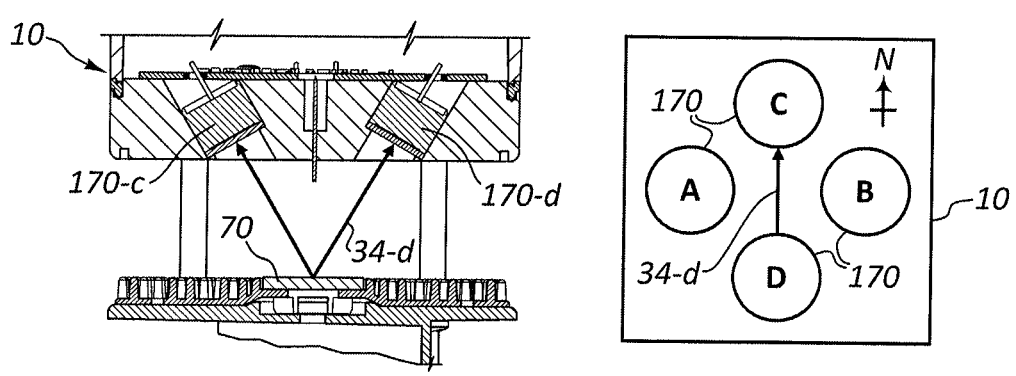

FIG. 6 illustrates a flowchart illustrating a method 200 performed by a sonic anemometer 10 or its components in accordance with various aspects of the present disclosure. In some examples, a sonic anemometer 10 may execute a set of codes to control the functional elements of the device and to perform the functions described below. Additionally or alternatively, the sonic anemometer 10 may perform aspects of the functions described below using special-purpose hardware.

The method 200 may illustrate one way a sonic anemometer may use sonic signals to determine characteristics of air movement in the environment that surrounds the sonic anemometer 10. For example, the sonic anemometer 10 may determine a velocity (e.g., magnitude and direction) of moving air. In certain examples, aspects of the operations of blocks described below may be performed by a signal manager 125 as described with reference to FIG. 5.

At block 205, the sonic anemometer 10 may select a transmitter to transmit a sonic signal and a receiver to receive the transmitted sonic signal. The transmitter and receiver may be examples of transducers configured to generate and/or receive sonic signals. In some cases, the sonic anemometer 10 may have a plurality of sonic transducers (e.g., four sonic transducers). The sonic transducers may be configured generate four unique sonic signals that travel in four unique directions. In other cases, the sonic anemometer 10 may have any number of sonic transducers and transmitter/receiver pairs.

At block 210, the sonic anemometer 10 may transmit the sonic signal using the selected transmitter. The sonic anemometer 10 determines one or more transmission parameters of the sonic signal before transmitting. Such transmission parameters may include a time that the sonic signal is transmitted, a frequency of the transmitted sonic signal, a phase of the transmitted sonic signal, an amplitude of the transmitted sonic signal, any modulations of the transmitted sonic signal, or a combination thereof. The sonic anemometer 10 may use its knowledge about the transmission parameters when determining characteristics about air movement or parameters expected to be received by the receiver. After the sonic signal is transmitted it travels along a signal path to the receiver. In some cases, the sonic signal may be reflected by a reflector of the sonic anemometer 10.

At block 215, the sonic anemometer 10 may measure one or more parameters of the received sonic signal at the receiver. As the sonic signal travels through the signal path, the air moving in the signal path may cause measurable changes to occur to the sonic signal. The sonic anemometer 10 may use the receiver and/or other components to determine these parameters about the sonic signal. Such measured parameters may include a time that the sonic signal is received, a frequency of the received sonic signal, a phase of the received sonic signal, an amplitude of the received sonic signal, any modulations of the received sonic signal, or a combination thereof.

At block 220, the sonic anemometer 10 may determine whether the parameters measured by the receiver are different from expected parameters. The sonic anemometer 10 may determine expected received parameters of the sonic signal based on the parameters of the transmitted sonic signal. For example, if sonic signal is transmitted with a given phase and the signal path is particular length, the sonic anemometer 10 may determine expected parameters based on what the measured parameter should be without any air movement in the signal path. The sonic anemometer 10 may compare the measured parameters to the expected parameters. In some cases, the sonic anemometer 10 may use the transmitted parameters directly without determining different expected parameters.

At block 225, the sonic anemometer 10 may determine whether additional sonic signals are needed to determine a velocity of moving air. Blocks 205-220 describe a process for analyzing a single sonic signal. In many instances, correct measurements of air velocity may involve using a plurality of sonic signals transmitted in a plurality of directions. For example, to determine the direction of air movement it may take analysis of sonic signals transmitted in many different directions. If additional sonic signals are needed, the sonic anemometer 10 may select a new signal direction for analysis. The sonic anemometer 10 may return and perform the functions of block 205-220 with the new sonic signal.

At block 230, the sonic anemometer 10 may determine one or more characteristics (e.g., magnitude and direction) of air movement based on the analysis of the sonic signals. In some cases, the sonic anemometer 10 may combine the analysis of the various sonic signals to obtain a more accurate measurement of air movement.

FIGS. 7A-7D illustrates how a sonic anemometer 10 that includes four sonic transducers 170 may operate in accordance with various aspects of the present disclosure. Each of FIGS. 7A-7D include a cross-sectional view of the sonic anemometer 10 and a simplified block diagram of the sonic anemometer 10. The sonic anemometer 10 may include a first sonic transducer 170-*a*, a second sonic transducer 170-*b*, a third sonic transducer 170-*c*, and a fourth sonic transducer 170-*d*. Each sonic transducer 170 may be an example of a transceiver configured to both transmit and receive sonic signals.

FIGS. 7A-7D each illustrate the transmission of a sonic signal 34 in a different direction. The sonic anemometer 10 in FIGS. 7A-7D is oriented so that sonic signals are transmitted in the cardinal directions (e.g., north, south, east, west). In other examples, the sonic anemometer 10 may be oriented in any direction. In some cases, the sonic anemometer 10 may be calibrated based on its orientation. A first sonic signal 34-*a* may be transmitted in an east direction using the first sonic transducer 170-*a* as transmitter and the second sonic transducer 170-*c* as a receiver. A second sonic signal 34-*b* may be transmitted in a west direction using the second sonic transducer 170-*b* as transmitter and the first sonic transducer 170-*a* as a receiver. A third sonic signal 34-*c* may be transmitted in a south direction using the third sonic transducer 170-*c* as transmitter and the fourth sonic transducer 170-*d* as a receiver. A fourth sonic signal 34-*d* may be transmitted in a north direction using the fourth sonic transducer 170-*d* as transmitter and the third sonic transducer 170-*c* as a receiver. In some cases, the pairs of transducers may be transmit sonic signals that are at known angles relative to one another. For example, in the example described above the direction of travel of the sonic signals for the first pair of transducers are orthogonal to the direction of travel of the sonic signals for the second pair of transducers.

The simplified block diagrams of FIGS. 7A-7D show the direction of travel of the sonic signals 34 and the relationship of the sonic signals 34 with the various sonic transducers 170. The cross-sectional views of FIGS. 7A-7D show how the sonic signals 34 may be reflected by a reflector 70 along their path between its respective sonic transducers 170. Sonic signals 34 illustrated in FIGS. 7A-7D may be used as part of the method 200 described with reference to FIG. 6.

Figure 8:
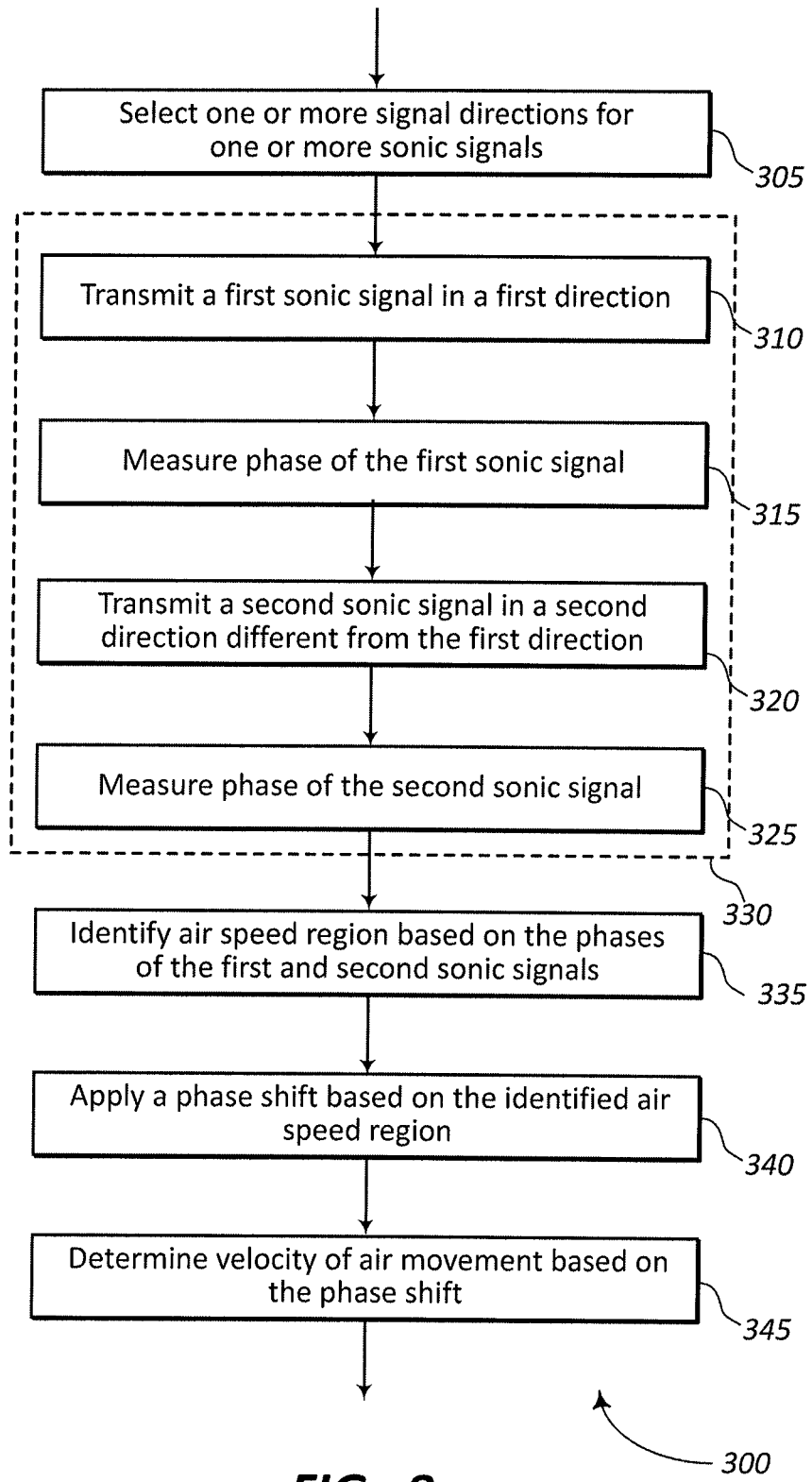
FIG. 8 illustrates a method of operation of the sonic anemometer of FIG. 1.

FIG. 8 illustrates a flowchart illustrating a method 300 performed by a sonic anemometer 10 or its components in accordance with various aspects of the present disclosure. In some examples, a sonic anemometer 10 may execute a set of codes to control the functional elements of the device and to perform the functions described below. Additionally or alternatively, the sonic anemometer 10 may perform aspects of the functions described below using special-purpose hardware.

The method 300 may illustrate a procedure through which a sonic anemometer 10 may extend the range of possible air movement magnitudes that can be measured by a sonic anemometer 10. Some sonic anemometers may use time differences between transmitted and received signals to determine a magnitude of air movement. Other sonic anemometers 10 may use differences in the phase of transmitted and received signals to determine a magnitude of air movement. In sonic anemometers that use phase, phase reversals may make it difficult to distinguish between certain magnitudes of air movement. For example, it may be difficult to distinguish air speeds between 0 meters per second (m/s) and 30 m/s from air speeds above 30 m/s. The method 300 illustrates techniques to identify air speeds that range between 0 m/s and approximately 60 m/s, rather than merely distinguishing air speeds between 0 m/s and 30 m/s.

At block 305, the sonic anemometer 10 may select one or more signal directions for one or more sonic signals. In some embodiments, the sonic anemometer 10 may select two or more signal directions for two or more sonic signals to distinguish air speeds in the range of 0 m/s and a first threshold (e.g., 30 m/s) and air speeds above the first threshold. The sonic anemometer 10 may select transmitter/receiver pair(s) of sonic transducers to communicate the sonic signal(s) in the signal direction(s). The transmitters and receiver may be examples of transducers configured to generate and/or receive sonic signals.

At block 310, the sonic anemometer 10 may transmit a first sonic signal in a first direction. The sonic anemometer 10 may determine one or more transmission parameters of the first sonic signal before transmitting. Such transmission parameters may include a time that the sonic signal is transmitted, a frequency of the transmitted sonic signal, a phase of the transmitted sonic signal, an amplitude of the transmitted sonic signal, any modulations of the transmitted sonic signal, or a combination thereof. In some cases, the first sonic signal may be reflected by a reflector of the sonic anemometer 10.

At block 315, the sonic anemometer 10 may measure a phase of the first sonic signal that is received at the receiver. As the first sonic signal travels through the signal path, the air moving in the signal path may cause measurable changes to occur to the phase of the first sonic signal. The sonic anemometer 10 may use the receiver and/or other components to determine the phase of the first sonic signal.

At block 320, the sonic anemometer 10 may transmit a second sonic signal in a second direction different from the first direction. The sonic anemometer 10 may determine one or more transmission parameters of the second sonic signal before transmitting. Such transmission parameters may include a time that the sonic signal is transmitted, a frequency of the transmitted sonic signal, a phase of the transmitted sonic signal, an amplitude of the transmitted sonic signal, any modulations of the transmitted sonic signal, or a combination thereof. In some cases, the second sonic signal may be reflected by a reflector of the sonic anemometer 10.

In some cases, the two sonic signals may be transmitted in opposite directions. For example, the first sonic signal may be transmitted east using a first sonic transducer as a transmitter as a second sonic transducer as a receiver and the second sonic signal may be transmitted west using the second sonic transducer as a transmitter and the first sonic transducer as a receiver. Based on differences and similarities between the two sonic signals, the sonic anemometer 10 may be configured to distinguish between certain air speeds in different ranges.

At block 325, the sonic anemometer 10 may measure a phase of the second sonic signal that is received at the receiver. As the second sonic signal travels through the signal path, the air moving in the signal path may cause measurable changes to occur to the phase of the second sonic signal. The sonic anemometer 10 may use the receiver and/or other components to determine the phase of the second sonic signal.

The sonic anemometer 10 may repeat functions included in block 330 for a number of different sonic signals. In some cases, the sonic anemometer 10 may transmit and measure the phase of a third sonic signal transmitted in a third direction different from the first direction and the second direction and a fourth sonic signal transmitted in a fourth direction different from the first, second, and third directions. For example, the third sonic signal may be transmitted in a south direction and the fourth sonic signal may be transmitted in a north direction. The sonic anemometer 10 may repeat these processes until a desired number of sonic signal measurements in a desired number of directions is obtained.

At block 335, the sonic anemometer 10 may identify an air speed region of the air speed measurement based on the measured phases of the first and second sonic signals. In some cases, the sonic anemometer 10 may apply one or more operations to the measured phases of the signals. For example, the sonic anemometer 10 may determine a difference between the phases of the first and second sonic signals and may sum the phases of the first and second sonic signals together. The sonic anemometer 10 may also determine a difference between the phases of the third and fourth sonic signals and may sum the phases of the third and fourth sonic signals. The sonic anemometer 10 may compare the phase differences and phase sums to a variety of different thresholds and/or criteria. The sonic anemometer 10 may be configured to determine an air speed region based on the differences and sums satisfying various combinations of the thresholds and/or criteria.

Air speed regions determined by the sonic anemometer 10 may define ranges of air speeds that have similar phase values. The phase of a signal is a periodic value that repeats itself. Consequently, a single phase measurement may indicate an air speed in multiple air speed ranges. Using the techniques described above, a sonic anemometer 10 may be configured to determine which air speed range a phase value falls into.

At block 340, the sonic anemometer 10 may determine a phase correction to apply the phase values based on the identified air speed range. For example, in a first air speed range between 0 m/s and a first threshold (e.g. 30 m/s), the phase correction may be approximately zero; in a second air speed range between the first threshold and a second threshold (e.g., 45 m/s), the phase correction may be approximately $2\pi$; and in a third air speed range between the second threshold and a third threshold (e.g., 60 m/s), the phase correction may be approximately 4 π.

At block 345, the sonic anemometer 10 may determine a velocity of air movement based on the measured phases and the phase correction applied to the measured phases. For example, the sonic anemometer 10 may determine that a given phase value corresponds to 15 m/s in a first air speed range and 33 m/s in a second air speed range. The phase correction may be used to determine which of those possible velocity values is correct.

In some cases, the sonic anemometer 10 may be configured to use the measured phase values, differences of the phases, sums of the phases, or a combination thereof to determine whether liquid has collected in the signal path (e.g., collected on the reflector). If liquid collects in the signal path, it may cause all of the measured phase values to shift above a certain threshold. If any measured phase is below the certain threshold it may indicate that liquid is not collected in the signal path. In some instances, the sonic anemometer 10 may make this determination prior to determining air speed ranges, phase shifts, phase corrections, and/or velocities related to those things.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration. An operating system utilized by the processor (or by I/O controller module or another module described above) may be iOS®, ANDROID®, MS-DOS®, MS-WINDOWS®, OS/2®, UNIX®, LINUX®, or another known operating system.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A sonic anemometer, comprising:
   a first sonic transducer configured to emit a sonic signal along a signal path;
   a second sonic transducer positioned in the signal path spaced away from the first sonic transducer; and
   a hydrophobic structure positioned in the signal path and configured to repel liquid away from the signal path.

2. The sonic anemometer of claim 1, wherein the sonic signal is configured to be reflected between the first and second sonic transducers.

3. The sonic anemometer of claim 1, wherein multiple hydrophobic structures are positioned in the signal path.

4. The sonic anemometer of claim 1, wherein the hydrophobic structure comprises a circular perimeter.

5. The sonic anemometer of claim 1, wherein the hydrophobic structure is configured to displace liquid from the signal path.

6. The sonic anemometer of claim 1, wherein the hydrophobic structure comprises a surface facing the first sonic transducer or the second sonic transducer.

7. The sonic anemometer of claim 6, wherein the surface is substantially flat.

8. The sonic anemometer of claim 1, wherein the first and second sonic transducers are oriented at non-orthogonal angles relative to an airflow direction across the signal path.

9. The sonic anemometer of claim 1, further comprising a housing supporting the first and second sonic transducers and including an aperture in which the hydrophobic structure is positioned.

10. The sonic anemometer of claim 1, further comprising a housing supporting the first and second sonic transducers and defining an air gap, wherein the signal path passes through the air gap, and wherein the hydrophobic structure comprises a surface facing the air gap.

11. A sonic anemometer, comprising:
    a sonic transducer configured to emit a sonic signal along a signal path;
    a reflector having a top surface positioned in the signal path, the top surface being configured to reflect the sonic signal;
    wherein the reflector is configured to remove liquid from the sonic signal path.

12. The sonic anemometer of claim 11, wherein the reflector is configured to displace liquid away from the top surface.

13. The sonic anemometer of claim 11, wherein the reflector is configured to displace liquid in a lateral direction relative to the top surface.

14. The sonic anemometer of claim 11, further comprising a base supporting the reflector, wherein the reflector is configured to displace liquid toward the base from the top surface.

15. The sonic anemometer of claim 11, further comprising a second sonic transducer configured to receive the sonic signal after reflection of the sonic signal by the reflector.

16. The sonic anemometer of claim 11, wherein the reflector is disk-shaped.

17. A method of using a sonic anemometer, the method comprising:
    transmitting a sonic signal from a first sonic transducer at a first end of a signal path, the signal path crossing an air gap;
    removing liquid from the signal path in the air gap by permitting the liquid to contact a hydrophobic material exposed to the air gap in the signal path;
    measuring the sonic signal at a second sonic transducer at a second end of the signal path; and
    determining a characteristic of air movement through the air gap based on the sonic signal.

18. The method of claim 17, further comprising reflecting the sonic signal between the first and second ends of the signal path.

19. The method of claim 17, wherein removing liquid from the signal path comprises repelling liquid in a direction away from the signal path.

20. The method of claim 17, wherein the liquid is removed from a circular area on the hydrophobic material.

* * * * *